United States Patent
Calli et al.

(10) Patent No.: US 12,377,565 B2
(45) Date of Patent: Aug. 5, 2025

(54) SALVAGE METAL CUTTING ROBOT

(71) Applicant: Worcester Polytechnic Institute, Worcester, MA (US)

(72) Inventors: Berk Calli, Worcester, MA (US); James Akl, Worcester, MA (US); Roger Morton, Warrington (GB)

(73) Assignee: Worcester Polytechnic Institute, Worcester, MA (US)

( * ) Notice: Subject to any disclaimer, the term of this patent is extended or adjusted under 35 U.S.C. 154(b) by 601 days.

(21) Appl. No.: 17/721,553

(22) Filed: Apr. 15, 2022

(65) Prior Publication Data
US 2022/0332003 A1   Oct. 20, 2022

Related U.S. Application Data

(60) Provisional application No. 63/175,166, filed on Apr. 15, 2021.

(51) Int. Cl.
*B26D 3/10*   (2006.01)
*B25J 11/00*   (2006.01)

(52) U.S. Cl.
CPC .............. *B26D 3/10* (2013.01); *B25J 11/00* (2013.01)

(58) Field of Classification Search
CPC . B26D 3/10; B25J 11/00; B25J 9/1687; B25J 11/0055; G05B 2219/31065; G05B 2219/40034; G05B 19/41805
USPC ......................................................... 700/259
See application file for complete search history.

(56) References Cited

U.S. PATENT DOCUMENTS

| | | | |
|---|---|---|---|
| 7,248,940 B2 * | 7/2007 | Neumann | B23K 26/046 700/170 |
| 2006/0082340 A1 | 4/2006 | Watanabe et al. | |
| 2015/0290826 A1 | 10/2015 | Saito | |
| 2016/0214143 A1 | 7/2016 | Nagatsuka | |
| 2017/0144303 A1 | 5/2017 | Luft | |

(Continued)

FOREIGN PATENT DOCUMENTS

| | | | | |
|---|---|---|---|---|
| CN | 104730673 B | * | 4/2018 | .......... G01C 15/002 |
| CN | 220963131 U | * | 5/2024 | |

(Continued)

OTHER PUBLICATIONS

International Search Report, PCT/US2022/024961, pp. 1-3, Aug. 2, 2022.

*Primary Examiner* — B M M Hannan
(74) *Attorney, Agent, or Firm* — Armis IP Law, LLC

(57) ABSTRACT

A robotic cutting device includes a cutting tool responsive to a mobile actuator adapted to apply a cutting force in a 3-dimensional (3D) space, and scanning logic configured to identify a cutting path denoted on an article for cutting. Using the cutting path, a mobile actuator is responsive to positioning logic for disposing the cutting tool along the cutting path for performing a prescribed cut on the article. The mobile actuator is a robotic arm responsive to an independent coordinate frame based on a position and orientation of a mobility vehicle supporting the mobile actuator. The mobility vehicle is typically a tracked or all-terrain capable chassis adapted to be disposed adjacent to the article such that the article is within range of the actuator. The mobility vehicle transports the robotic cutting device adjacent to the article to be cut, such that the cutting path is within reach.

18 Claims, 8 Drawing Sheets

(56) References Cited

U.S. PATENT DOCUMENTS

2020/0156257 A1    5/2020  Sage
2020/0290144 A1    9/2020  Schmidt et al.
2021/0034032 A1*   2/2021  Hebenstreit ........ B23Q 17/2233

FOREIGN PATENT DOCUMENTS

CN      221623926  U   *   8/2024
DE    112019004519  T5  *   6/2021    ............ B25J 9/0081
JP        H08334505  A   *  12/1996

* cited by examiner

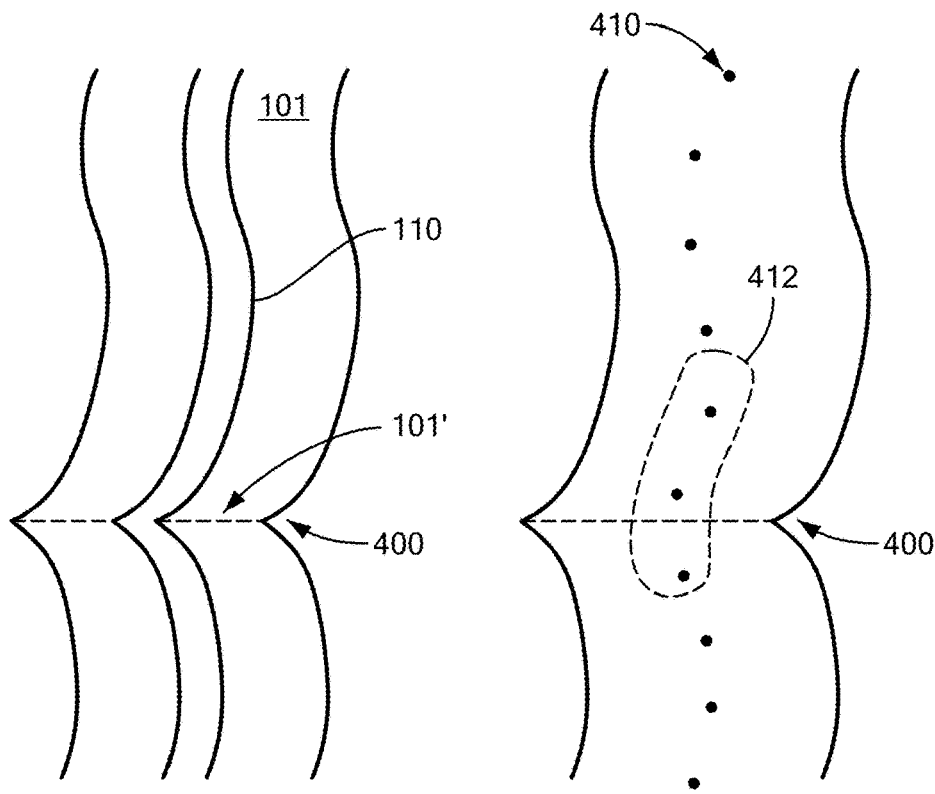
*FIG. 4A*     *FIG. 4B*
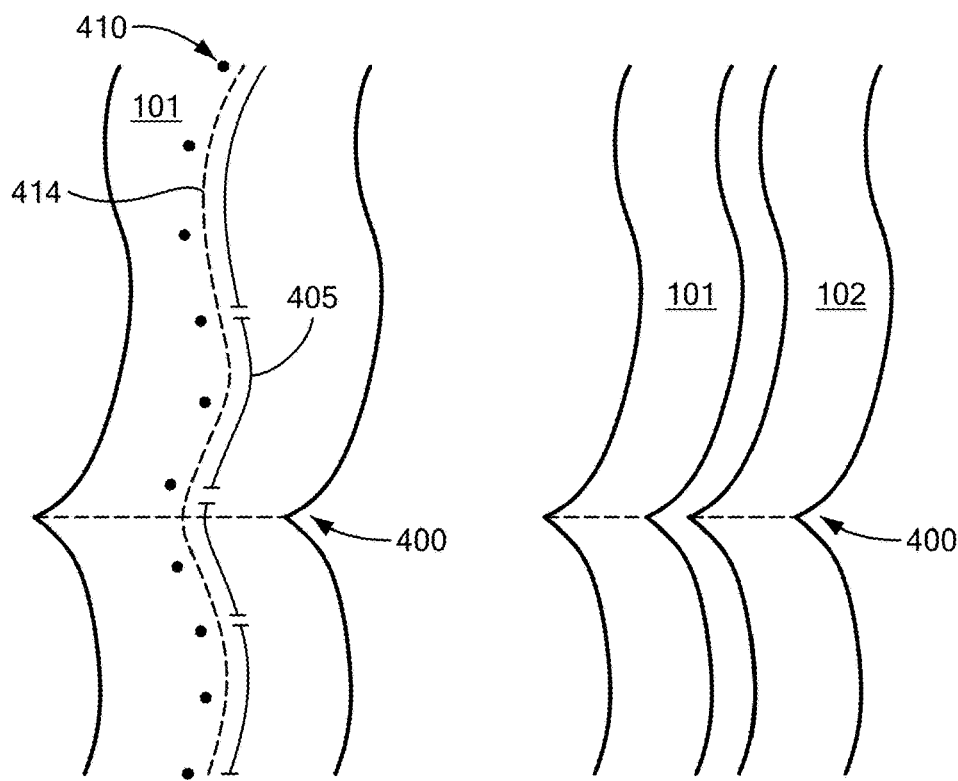
*FIG. 4C*     *FIG. 4D*

SALVAGE METAL CUTTING ROBOT

RELATED APPLICATIONS

This patent application claims the benefit under 35 U.S.C. § 119(e) of U.S. Provisional Patent App. No. 63/175,166, filed Apr. 15, 2021, entitled "SALVAGE METAL CUTTING ROBOT," incorporated herein by reference in entirety.

STATEMENT REGARDING FEDERALLY SPONSORED RESEARCH AND DEVELOPMENT

This invention was developed, at least in part, with U.S. Government Support under contract number 1939061. awarded by the NSF (National Science Foundation) Industry/University Cooperative Research Center (I/UCRC). The Government has certain rights in this invention.

BACKGROUND

Salvaging and recycling large, decommissioned metal structures such as oil rigs, ships, equipment (e.g. large engines) generally requires them to be dismantled, moved to a metal scrap yard and cut into small workable segments or chunks. Dismantling and recycling the structures to reclaim the raw materials often requires manual cutting operations. Depending on the skill of the workers and available tools such as gas torches, the work is generally slow, labor intensive and often dangerous.

SUMMARY

A robotic cutting device includes a cutting tool responsive to a mobile actuator adapted to apply a cutting force in a 3-dimensional (3D) space, and scanning logic configured to identify a cutting path denoted on an article for cutting. Using the cutting path, a mobile actuator is responsive to positioning logic for disposing the cutting tool along the cutting path for performing a prescribed cut on the article. The mobile actuator includes a robotic arm responsive to an independent coordinate frame based on a position and orientation of a mobility vehicle supporting the mobile actuator. The mobility vehicle is typically a tracked or all-terrain capable chassis adapted to be disposed adjacent to the article such that the article is within range of the actuator. The mobility vehicle transports the robotic cutting device adjacent to the article to be cut, which may be in rough, wet and/or hazardous terrain, such that the cutting path is within reach.

Configurations herein are based, in part, on the observation that salvage operations involve severing and cutting large and heavy portions of salvage articles, typically large metal salvage objects such as ships, vehicles, engines and similar industrial equipment. Unfortunately, conventional approaches to industrial salvage operations suffer from the shortcoming that these severed salvage articles present a danger to human workers in proximity, particularly due to a potential for sudden and violent shifting during cutting. Salvage and dismantling operations of large, ocean going vessels, for example, only occurs in a small number of locations around the world, primarily due to loosely defined worker protection laws that tend to shield the employer from injury liability. Accordingly, configurations herein substantially overcome the shortcomings of conventional, manual salvage operations by presenting a workflow that leverages worker intuition with automation of manual tasks to present a human-robot collaboration workflow that combines the strengths of skilled workers and robotic systems defined by the mobile actuator.

In an expected usage environment, the workers and robots work in collaboration such that the worker need only mark the cutting locations on the scrap metal with spray paint or other visually pigmented material, and the robotic cutting device generates the cutting trajectories accordingly. This approach leverages the human expertise for identifying optimal cutting locations, while transferring the mundane, dirty and dangerous aspects of the work to the robot. On the robot side, this approach employs a 3D exploration and curve reconstruction stage for path generation.

In further detail, the method for automated dismantling of irregularly shaped salvage components includes identifying a cutting path on a surface of a salvage article, and traversing the cutting path based on optical recognition of the surface for generating a set of points defining the cutting path, where the cutting path traversing a plurality of planes due to the irregular nature of the salvage article. The mobile robotic actuator passes a cutting tool along a curve defined by the set of points, where the cutting tool is responsive to an actuator driven based on the generated curve.

The cutting device includes a camera, imager or other optical sensor, such that the scanning logic is responsive to the visual sensor for tracking a deposited pigmentation on the article, i.e. a bright, spray painted line. Spray paint or a similar, easily applicable contrasting substance allows image recognition and feature detection for visually surveying and mapping the spray painted line defining the cutting path. This approach avoids the use of volatile materials, magnetic or radioactive means, which may not be desirable and/or effective in a large scrap or demolition environment. The scanning logic is therefore operable to detect features based on the deposited pigmentation in the spray paint. The scanning logic may separate the features based on color filtering and a predetermined color of the pigmentation, such that the predetermined color provides a contrast with the article. Waste metals typically have a generally dark, dull and neutral color, therefore any brightly colored pigment should produce sufficient contrast.

In a two pass manner, a robotic cutting effort includes invoking the scanning logic to identify a set of points defined by the deposited pigmentation, effectively following the line around the article. The scanned points on the cutting line are typically not in the same plane, and may even include substantial deviations such as acute angles or protruding surfaces. The scanning logic also identifies a first terminus point and a second terminus point denoting ends of a curve (meaning an arbitrary line) defined by the deposited pigmentation, marking the commencement and completion of a cut. The frame of reference defined by the mobility vehicle may therefore remain consistent. The scanning logic computes a continuous cutting path including the first terminus point, the second terminus point and the intermediate set of points defining the complete cutting path.

In scanning and detecting the set of points that define the cutting path, it is significant to consider that the article for salvage may have a number of irregular shape features, such as bends, protrusions, and acute or reverse angles, and may occupy a number of different planes. It is therefore important to not assume that the robot has a full view of the curve, nor that the extremities (start, end) of the curve are perceptible to the optical sensor at all times. The spray paint line provides a facilitated demarcation of cutting locations that can draw upon worker expertise, and need not encumber the worker with conforming to "rules" about what kinds of angles and surfaces are interpretable by the scanning logic.

The drawn curve is then reconstructed from partial observations in an automated process, akin to a simplified, surface-based active vision problem. Particular configurations employ a 3D curve reconstruction pipeline, while using spatial curve fitting techniques to obtain a next-view for iterative scanning. The acquired curve segments are then registered, and the full cutting path is obtained by generating collision free set-points at a desired cutting distance, where the cutting torch is maintained perpendicular to the object surface for cutting effectiveness.

Once the scanning logic has defined the cutting path, the positioning logic is configured to compute a 3D skeletonization based on the continuous cutting path and points defined therein. This 3D skeletonization approximates the outer boundaries of a shape to be traversed by the actuator in guiding the cutting tool, typically a gas torch. The positioning logic aligns the 3D skeletonization with the independent coordinate frame based on the actuator and the mobility vehicle. Once positioned, the mobility vehicle allows scanning of the sprayed line and positioning of the actuator for passing the cutting tool within the range of the 3D skeletonization from a consistent frame of reference. The positioning logic then disposes the actuator and cutting tool into engagement with the article based on the continuous cutting path.

The cutting tool is typically a cutting torch or similar gas driven incineration device having a fuel based on a melting temperature of the article, and the actuator is configured to engage the article in a perpendicular orientation with a surface of the article. Alternate cutting mechanisms may be employed, however the cutting torch has a temperature and speed for optimal efficiency and likely surface/article materials. The actuator is adapted to be disposed at a speed based on the material of the article, and may be derived from a mapping of material types to cutting speeds. An effective cutting speed may therefore be computed based on a manual or automatic identification of the material to be cut (i.e. ¼ in. steel, ½ inch aluminum, etc.), or from optical feedback based on observed cutting speed, surface temperature, or other similar factors.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A-4D show a progression of marking, scanning and cutting on an irregular salvage article having a peak;

DETAILED DESCRIPTION

Metal recycling in scrapyards, where workers cut decommissioned structures using gas torches, is labor-intensive, difficult, and dangerous. As global metal scrap recycling demands are rising, robotics and automation technologies have potential to play a significant role to address this demand. However, the unstructured nature of the scrap cutting problem-due to highly variable object shapes and environments-poses significant challenges to integrate robotic solutions. A collaborative workflow for robotic metal cutting combines worker expertise with robot autonomy. In this workflow, the skilled worker studies the scene, determines an appropriate cutting reference, and marks it on the object with spray paint. The robot then autonomously explores the surface of the object for identifying and reconstructing the drawn reference, converts it to a cutting trajectory, and finally executes the cut.

Figure 1:
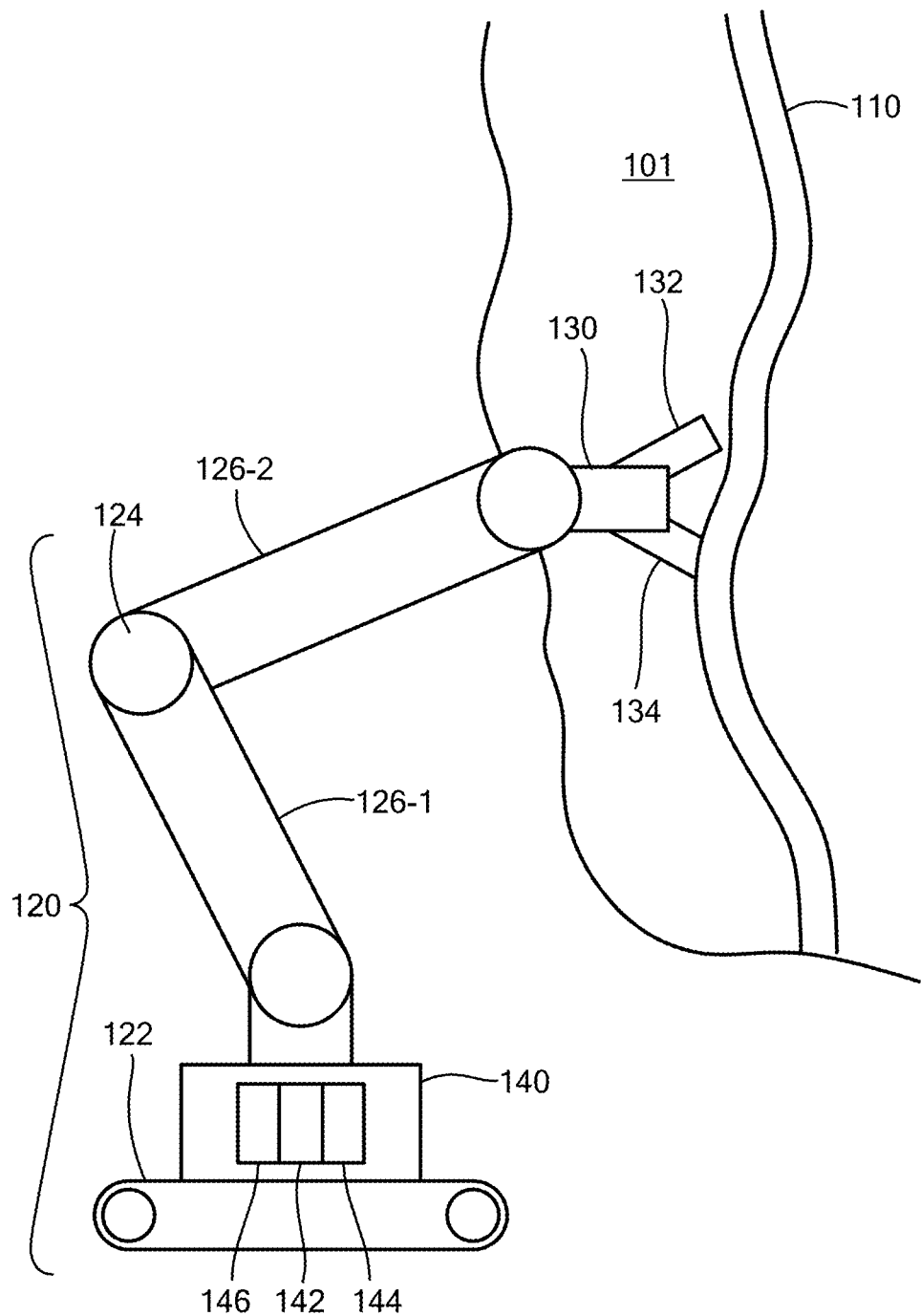
FIG. 1 is a context diagram of a robotic cutting environment suitable for use with configurations herein.

FIG. 1 is a context diagram of a robotic cutting environment 100 suitable for use with configurations herein. Referring to FIG. 1, a method for automated dismantling of irregularly shaped salvage components includes forming or applying a drawing 110 or marking of a cutting path on a surface of a salvage article 101. The salvage article 101 is typically a large metal object from retired machinery, vehicles, vessels or structures, sought for breaking into smaller portions (which may themselves define other salvage articles) for transport, recycling or reuse.

Recycling decommissioned large metal structures (e.g. oil rigs and ships) or equipment (e.g. large engines) requires them to be dismantled, moved to a metal scrap yard and cut into small workable chunks. At present, the conventional cutting operation is conducted manually by skilled workers using a gas torch. This manual operation is slow and labor-intensive. Due to the variety of the scrap pieces and the difficult and unstructured nature of this process, automating this task presents many challenges: For each piece, the cutting locations and trajectories need to be determined, the cutting parameters need to be identified (based on material type and thickness), and the cut needs to be executed at certain torch speed and poses. All these operation variables are may be intuitively estimated or determined and applied by skilled workers, but are very challenging to translate into robot task parameters.

Configurations herein present a human-robot collaboration workflow that combines the strengths of skilled workers and robotic systems. In brief, workers draw the desired cutting locations on salvage articles such as metal scrap pieces using spray paint, and the robotic actuator inspects the drawn location with its onboard camera and generates cutting trajectories based on object shape and materials. This workflow has many advantages:

Cutting locations are determined by the worker, reducing the decision making effort significantly on the robot's side.

The robot does not need to scan the whole object; it can work with the local information on the cutting locations.

The labor intensive work is minimized for the worker, since the slow, dangerous and tedious cutting operation is done by the robot.

The problem of robotic cutting varies greatly across application domains and depends on the specific tooling used, which in turn defines the cutting properties (quality, speed, compatible materials). There is abundant work on automated laser cutting; for example, analytical methods that assume target object knowledge, as well as path planning in structured settings. These methods rely on prior object knowledge, i.e. a full object model, and do not directly translate to gas touch cutting. In contrast, the disclosed approach does not rely on prior knowledge of object geometry.

Conventional robotic gas cutting work develops a visionless reactive control architecture for identifying poor strips in sensitive yet constrained surroundings. This method is designed for a specific, predetermined object shape and application. In contrast to the disclosed approach, conventional robotic methods for gas cutting are not general enough to be applied to metal scrap recycling due to the irregularity of the input stock.

A close application domain to metal cutting is welding. In this domain, the robots rely on weld seam tracking; and seam identification. However, this method requires a full view of a sufficiently thin line. Other conventional methods borrow ideas from active vision, which may enable precise following of a weld seam, but are unsuitable for scrap metal cutting. This is because the drawings encountered are noisier and thicker, and the objects explored are much larger. conventional noise-resistant approaches require prior knowledge of the welding seam. Pristine factory environments for new goods may enjoy clean, predictable metal stock conforming to certain quality and visual/optical properties. Expired machinery relegated to a scrapyard cannot be relied upon for such predictable qualities.

Returning to the apparatus and method as disclosed herein, a mobile actuator 120 includes a drive 122 such as a set of tracks and a robotic arm 124 including one or more robotic members 126-1 . . . 126-2 (126 generally) for approaching the salvage article 101 and applied drawing 110 defining a proposed cutting path. An end effector 130 attaches to an end of the robotic arm 124 and includes an optical sensor 132 and a cutting tool 134. The optical sensor 132 is adapted to detect the cutting path based on a contrast of the drawing 110 with a surface of the salvage article 101. The cutting tool 134 is a torch or blade adapted to sever the material composing the salvage article.

Positioning logic 140 in the mobile actuator 120 includes an image processor 142 for receiving and analyzing visual frames of the drawing 110, line fitting logic 144 for computing coordinate points defining the drawing, and a coordinate guidance processor 146 for directing robotic movements of the robotic arm 124 in response to the computed coordinate points.

In operation, the mobile actuator 120 traverses the cutting path with the optical sensor 132 via optical recognition of the drawing 110 on the surface for generating a set of points defining the cutting path, where the cutting path traversing a plurality of planes along the irregular, often jagged, profile of the salvage article 101. It then passes the cutting tool 134 along a curve defined by the set of points, where the cutting tool 134 is responsive to the actuator 130 driven based on the curve.

Figure 2:
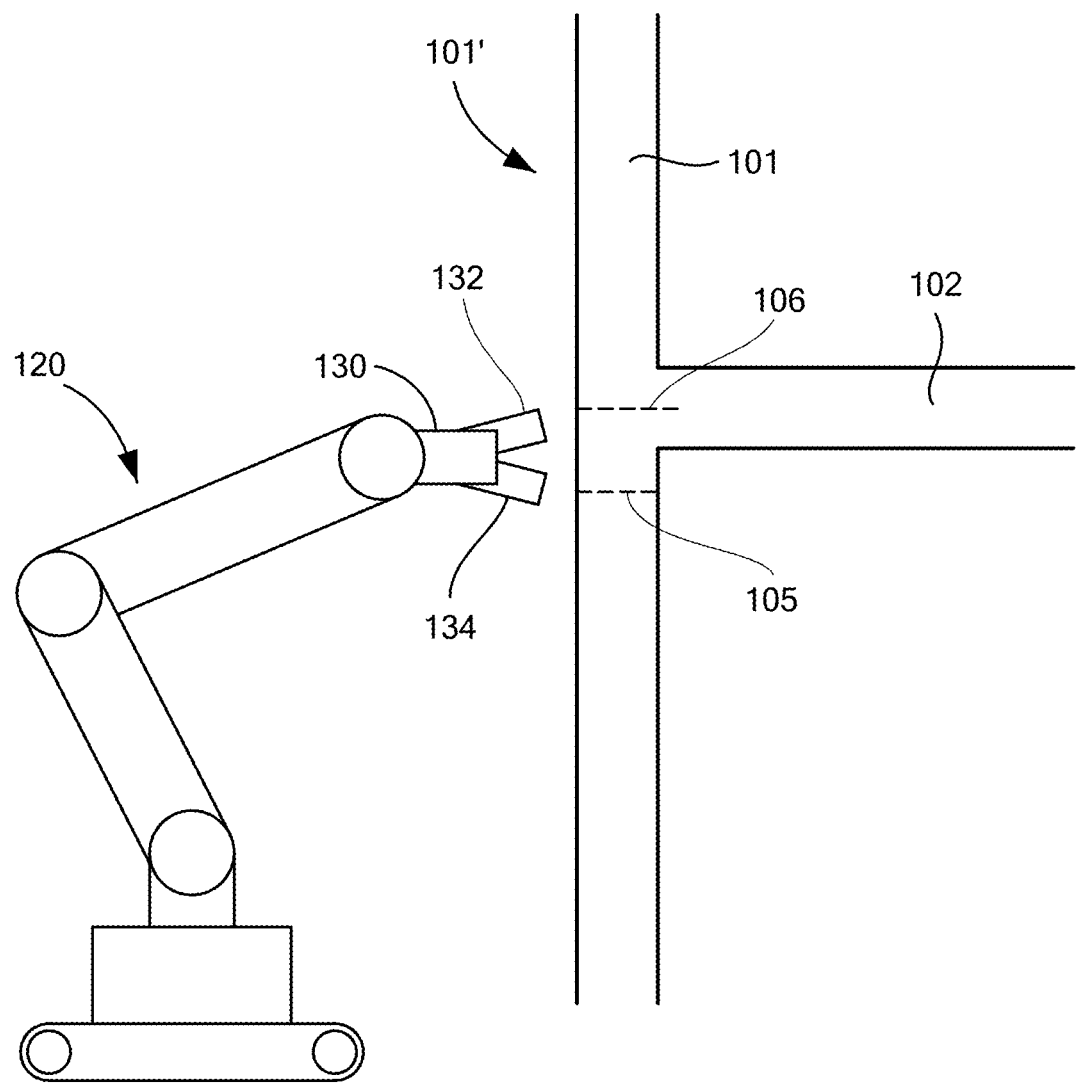
FIG. 2 shows an example of the collaboration workflow applied by the robot in FIG. 1.

FIG. 2 shows an example of the collaboration workflow applied by the robot in FIG. 1. Analysis of a full salvage article may be time and computationally intensive, and not particularly feasible to automate. Structural knowledge, experience and intuition of the salvage article is beneficial to directing where to cut. An example is shown in FIG. 2. An optical recognition of a surface 101' of the salvage article 101 cannot assess structural ramifications such as reinforcement members 102 on an opposed side of the surface 101'. Such "T" and triangular shapes, as well as other reinforcement members, are often found in salvage articles. A cutting line for severing seam 105 would be preferable to severing seam 106, as a cutting tool will encounter difficulty cutting completely through at seam 106 due to the attachment of the reinforcement member 102, not visible from the surface 101'. Application of the drawing 110 allows recognition of structural limitations and selection of optimal cutting locations, based on intuition and structural information about the article 101. The robotic mobile actuator 120 may then undertake the more dangerous phase of implementing the cut according to the marked drawing 110.

Figure 3B:
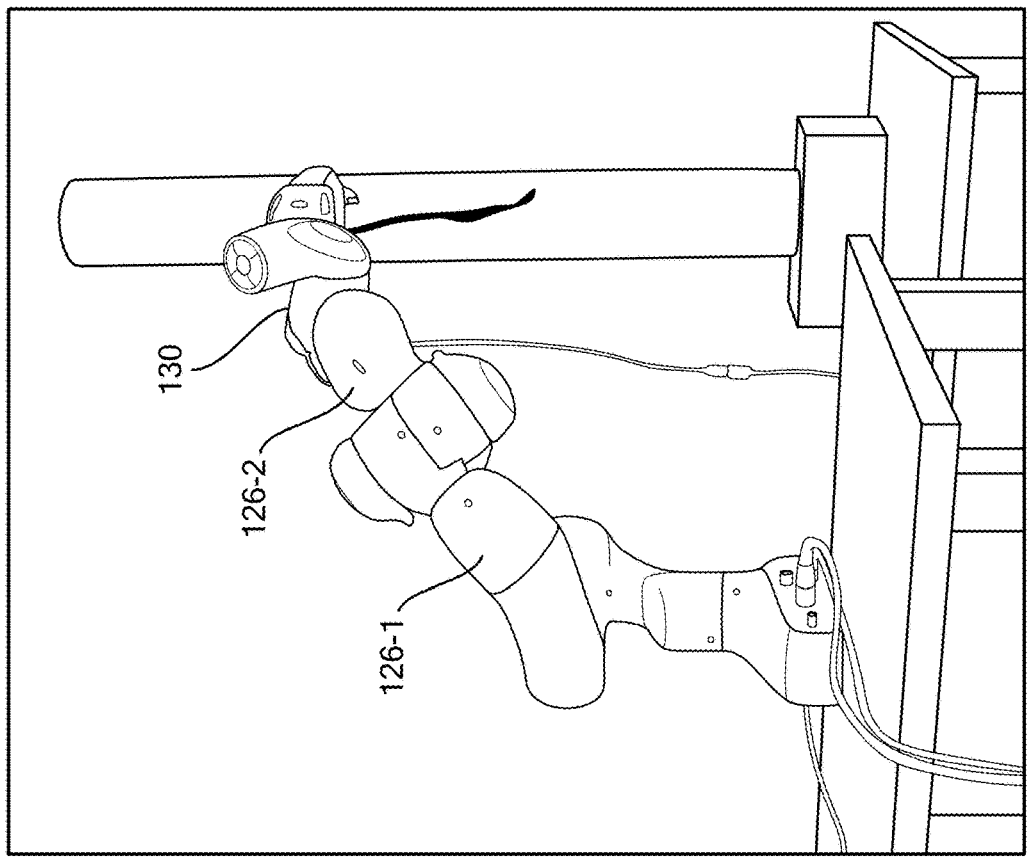
FIGS. 3A-3D show a traversal of a marking on a non-planar, 3 dimensional article.
Figure 3A:
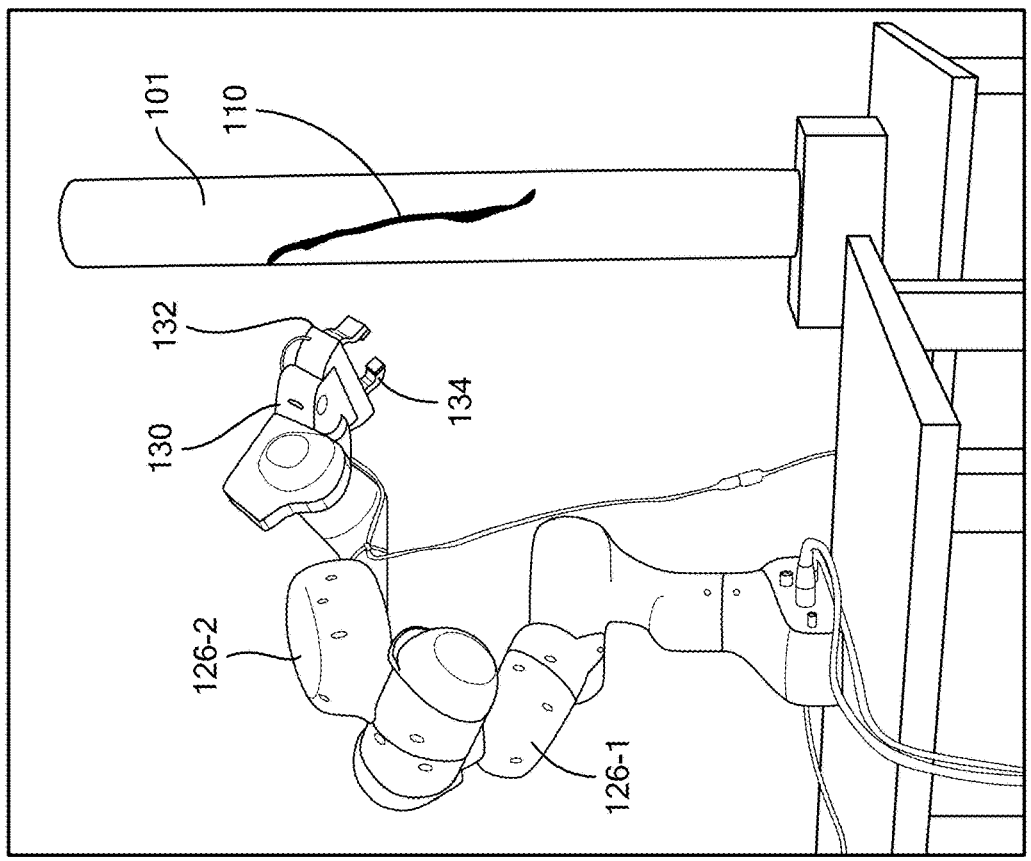
Figure 3D:
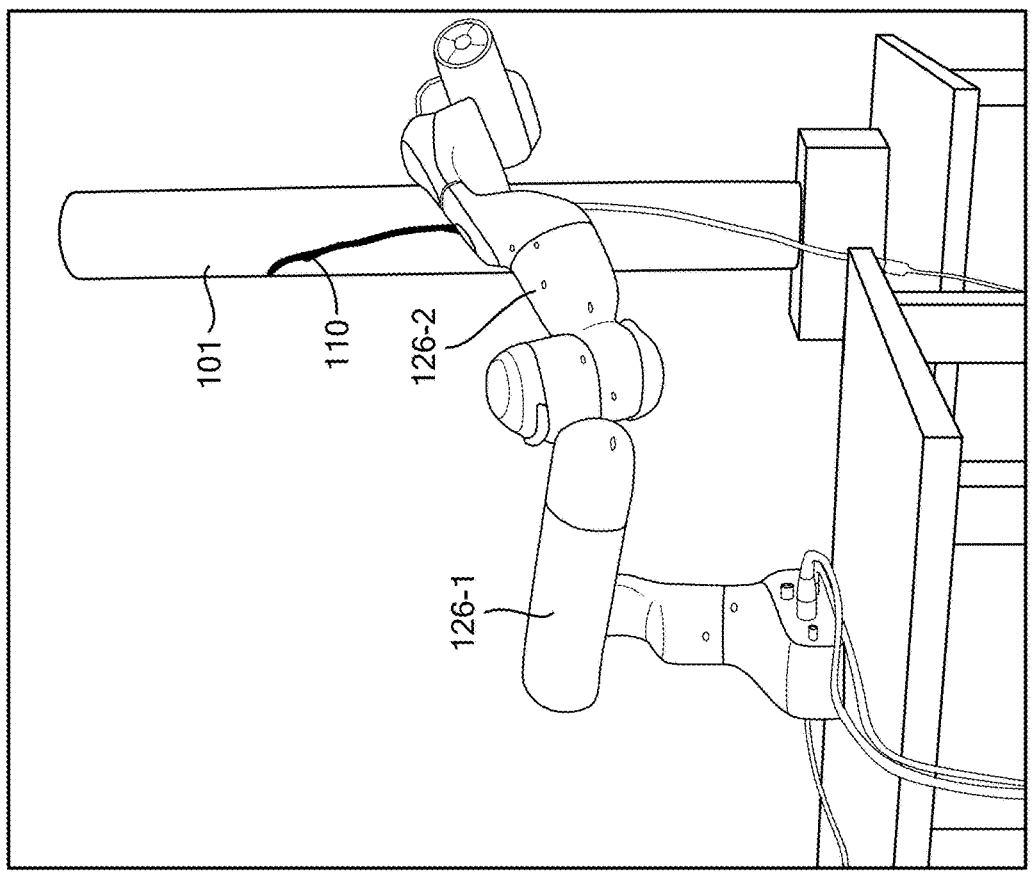
Figure 3C:
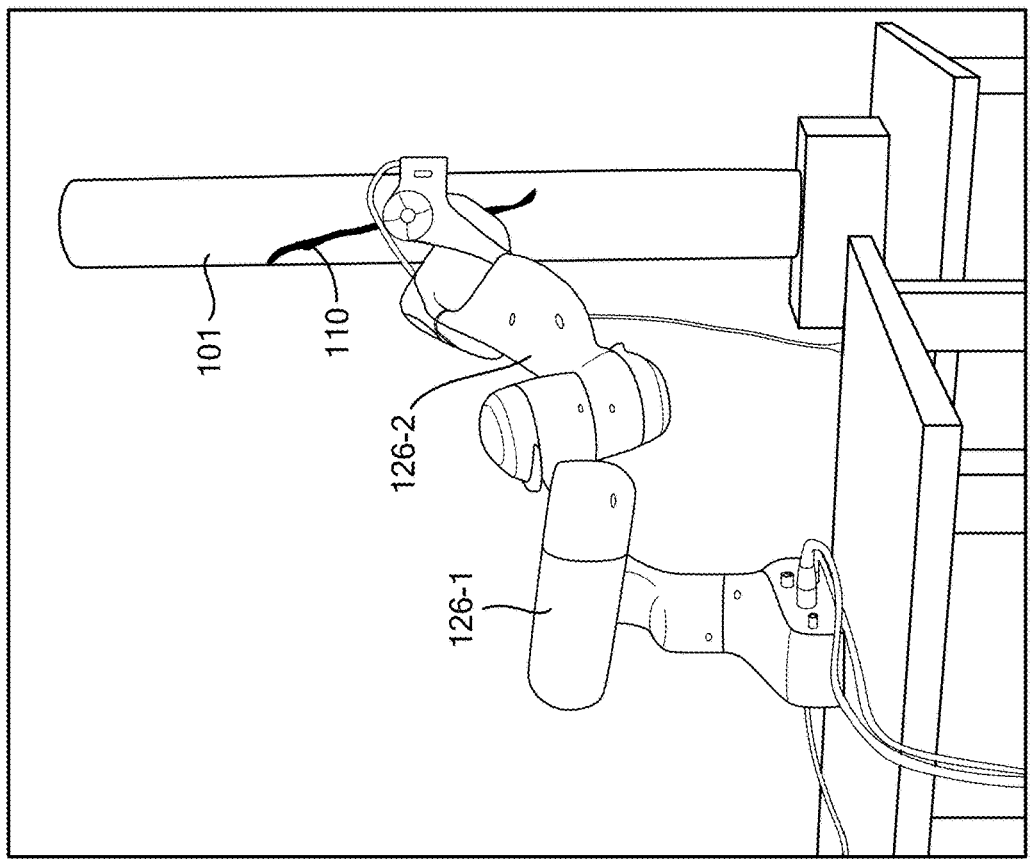

FIGS. 3A-3D show a traversal of a marking on a non-planar, 3 dimensional salvage article defined by a cylindrical structure for demonstrating actuation across multiple planes. Referring to FIGS. 1-3D, the drawing 110 of the cutting path is formed on the salvage article 101 from application of a pigmented substance to the salvage article based on a 3 dimensional structure exhibited by the salvage article, where the pigmented substance contrasts with a coloration of the salvage article for optical recognition. In FIG. 3B, the actuator 130 approaches the article 101 for aligning the set of points in a 3 dimensional coordinate space, and disposes the actuator 130 according to a position in the 3 dimensional coordinate space. In FIG. 3C the actuator is disposed along the drawing 110, and in FIG. 3D identifies an endpoint of the line, discussed further below. A two pass operation may include first scanning the drawing 110 by the optical sensor 132 for identifying the cutting path, and a second pass for applying the fitted curve in guiding the cutting tool 134 to the article 101. Alternatively, a single pass may compute the fitted curve in portions or continuously with cutting.

As indicated above, conventional approaches cannot automate a cutting operation to an arbitrary shape of a salvage article without prior constraints on the pattern or shape to be cut. Use of an applied drawing denoting cutting locations for substantially concurrent analysis and cutting (severing, torching, or otherwise physically separating) a scrap item for salvage has not been shown in conventional approaches.

Spatial line reconstruction approaches may be employed to operates on 3-D point clouds. Common reconstruction methods rely on the optimization formulation of B-Splines, Non-uniform rational basis spline (NURBS), or Be'zier curves. For example, there are iterative methods for surface fitting in the presence of obstacles, as well as reconstruction of self-intersecting lines. More complicated shapes have been reconstructed by partitioning them for further fitting using multiple curves. An alternative approach is using principal curves that are based on principal component analysis. These resemble the typical skeletonization algorithms but the latter are instead used to represent the connectedness of N-dimensional binary shapes and easily represent branching paths. Skeletonization is traditionally implemented in thinning algorithms for 2-D images, but extends to 3D.

Various curve fitting approaches have special properties, advantages, and limitations for the purpose of spatial curve reconstruction. Configurations herein adopt variations of NURBS and the skeletonization approaches, and evaluate relative benefits and drawbacks in various configurations.

In the salvage industry, workers in the scrap yard can easily identify the metal types and the cutting locations via a quick visual inspection. Conventional approaches then cut the parts using a gas torch (often oxy-propane). Although the cutting locations on a scrap piece can be determined in a few minutes, it requires domain-specific expertise of the skilled worker and a global shape knowledge of the target object.

On the other hand, the cutting operation itself is repetitive, but quite laborious and time-consuming.

As a solution to this problem, a robot collaboration framework takes advantage of intuition for drawing a cutting path and minimizes the dull, dirty and dangerous aspects of the manual work. Determining the cutting locations requires worker's tacit intuition, and may be problematic or expensive to automate or distill into an algorithm. Therefore, in an example configuration the worker's role is to mark the desired cutting locations with a distinctive color spray paint, which constitutes guidelines for the robot. After this manual step, the robot autonomously detects the 3D curve on the object surface, reconstructs it, generates a cutting path and executes the cutting.

While there is appreciable potential within this pipeline for further automating the process, substantial benefits are afforded by the curve acquisition and path generation steps. The robot need not have a full view of the curve, nor that the extremities (start, end) of the curve are in sight. The drawn curve is reconstructed from partial observations in an automated process, akin to a simplified, surface-based active vision problem. A 3-D curve reconstruction pipeline uses spatial curve fitting techniques to obtain a next-view for iterative scanning. The acquired curve segments are then registered, and the full cutting path is obtained by generating collision free set-points at a desired cutting distance, where the cutting torch is generally perpendicular to the object surface. This path can then be converted to a cutting trajectory by imposing tool speed constraints based on the scrap piece's properties (material and thickness). Alternatively, the scrap properties may simply be specified or input as parameters, and the robot can utilize a look-up table for determining the cutting speed.

FIGS. 4A-4D show a progression of marking, scanning and cutting on an irregular salvage article having a peak 400. Referring to FIGS. 1-4D, in FIG. 4A, the drawing 110 is formed on the salvage article 101 to extend across the article including over a peak 400, where the topography of the surface 101' changes from planar or near planar to a sharp angular deviation. In FIG. 4B, the image processor 142 identifies a cutting path on the surface 101' of the salvage article 101. The optic sensor 132 traverses the cutting path based on optical recognition of the surface for generating a set of points 410 defining the cutting path, where the cutting path traverses a plurality of planes as exhibited by the peak 400. The line fitting process 144 acquires the curve by identifying curve segments based on sequences 412 of consecutive points, and determines a sequence of collision free points at a predetermined distance from adjacent points in the sequence. In FIG. 4C, the positioning logic 140 applies a curve fitting operation to the set of points 410 for fitting a curve to a line 414 defined by the set of points 410, based on computed segments 405. The coordinate guidance 146 then advances the cutting tool 134 based on avoiding revisitation of a previously explored direction. This includes determining a successive position of the cutting tool 134 based on extrapolation of a subset of previous points of the set of points passed by the cutting tool 134. Complete passage of the cutting tool separates a portion 102 from the salvage article 101.

Figure 5:
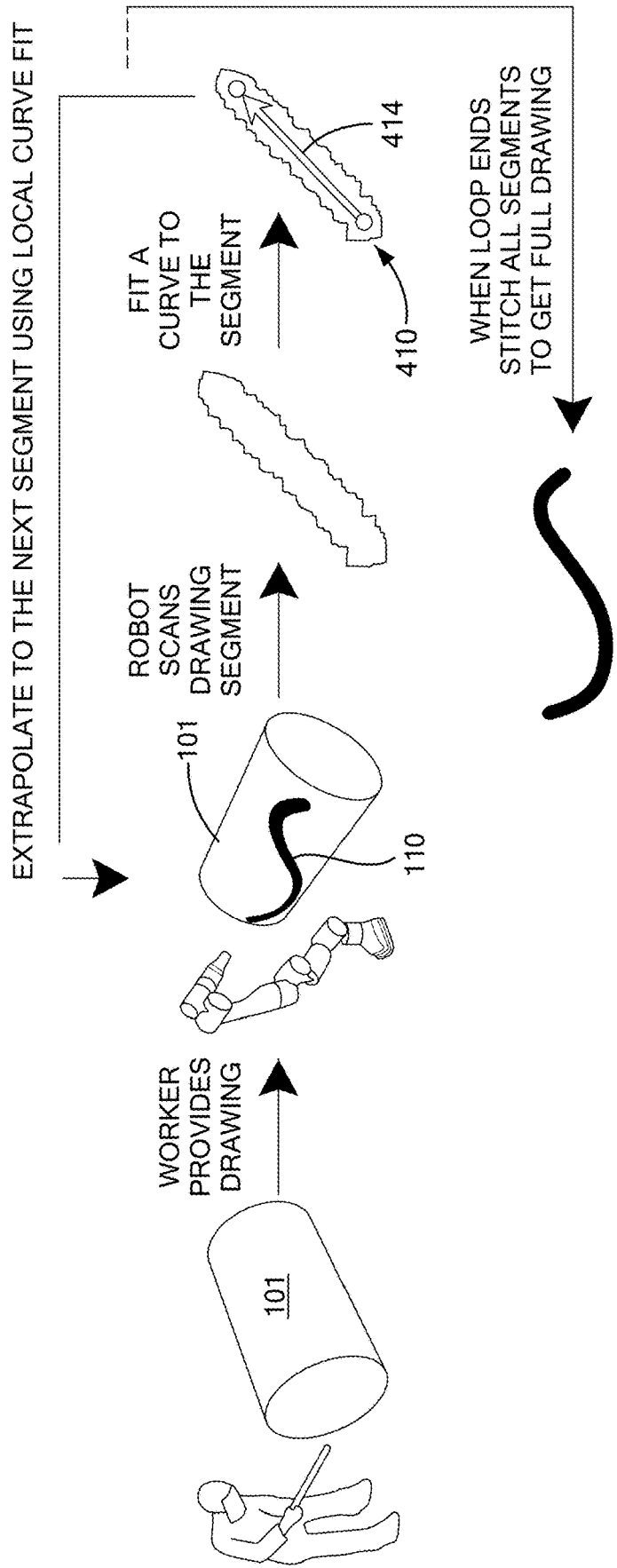
FIG. 5 shows a progression of cutting steps applied to a salvage article.

FIG. 5 shows a progression of cutting steps applied to a salvage article as in FIGS. 4A-4D. The worker provides the desired cutting path in the form of a drawing 110, whose specific color is known to the mobile actuator 120 and positioning logic, and is distinguishable from its surroundings. Following that the robotic mobile actuator begins scanning this drawing 110 segment by segment, and stitches them together as detailed in FIG. 6.

Figure 6:
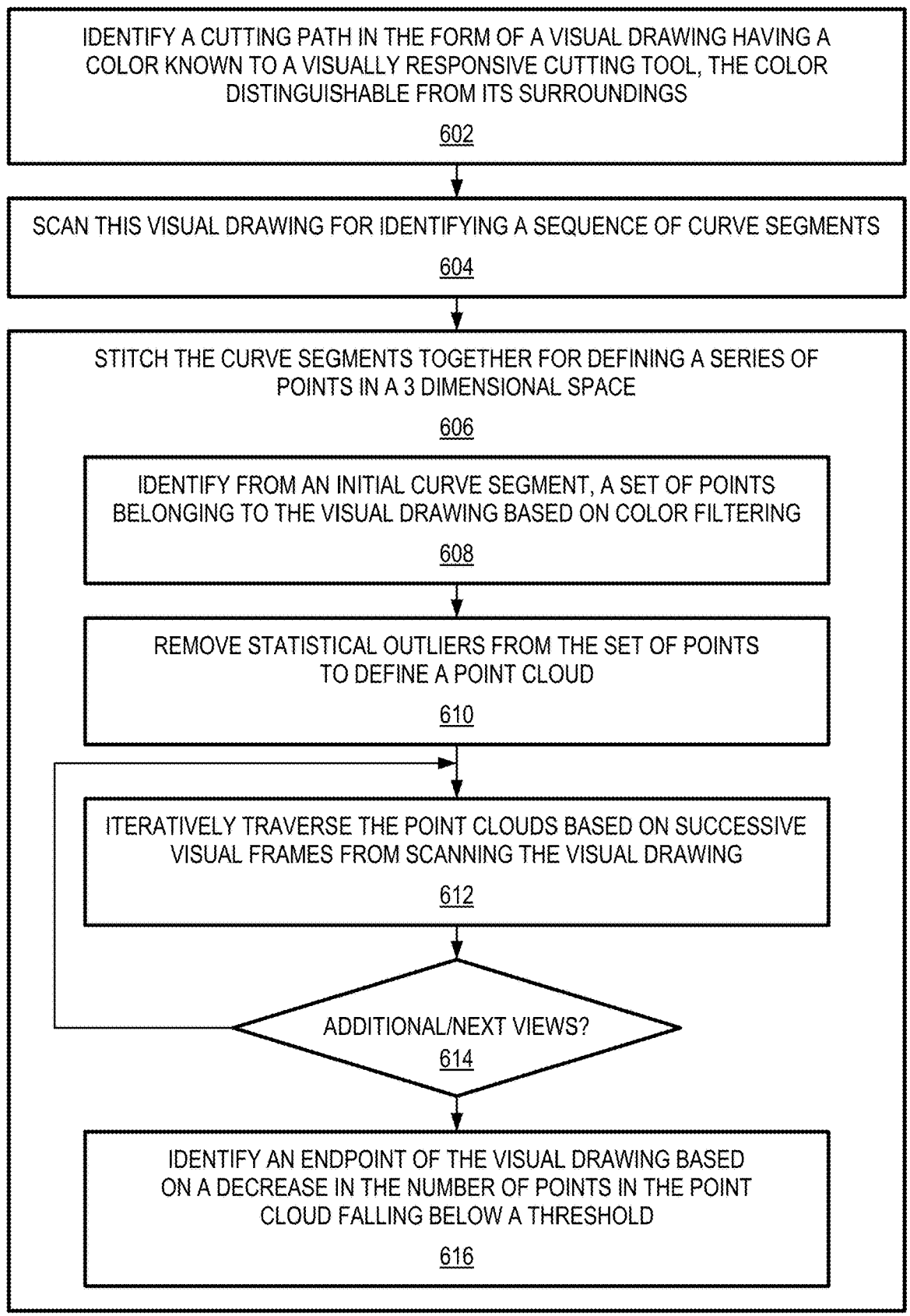
FIG. 6 shows a flowchart for directing the robot as in FIG. 5.

FIG. 6 shows a flowchart for directing the robot as in FIG. 5. Referring to FIGS. 1-6, with the initial segment of the drawing in view, the method of severing a portion of a salvage article according to a predetermined cutting path includes, at step 602 identifying a cutting path in the form of a visual drawing having a color known to a visually responsive cutting tool, where the color distinguishable from its surroundings. Color filtering using an HSV (hue, saturation, value) color space may be employed to obtain the points that belong to the drawn curve, or drawing 110. The visual drawing 110 is scanned for identifying a sequence of curve segments, as shown at step 604. The curve segments are stitched together for defining a series of points in a 3 dimensional space, as depicted at step 606. This includes the following steps. The line fitting process 144 identifies, from an initial curve segment, a set of points belonging to the visual drawing based on color filtering, as disclosed at step 608. A statistical outlier removal is performed to eliminate noisy points that do not belong to the dominant curve, as depicted at step 610. To reduce excess growth of cloud data, the point clouds are downsampled. The next step is to fit a curve to the acquired data. The positioning logic 140 may utilize different methods for curve fitting, namely the NURBS method and a skeletonization approach. The NURBS curves have desirable properties for this pipeline. They are memory-efficient and have a configurable smoothness parameter. Fitting a Be'zier curve to a point cloud (obtained from the RGB-D camera) is a non-trivial optimization problem, however available implementations provide NURBS fitting support. Configurations herein are modified to allow for open curves. The NURBS curve is especially robust to noise and gaps in the point clouds. Its functionality extends further on discontinuous mesh shapes.

Figure 7:
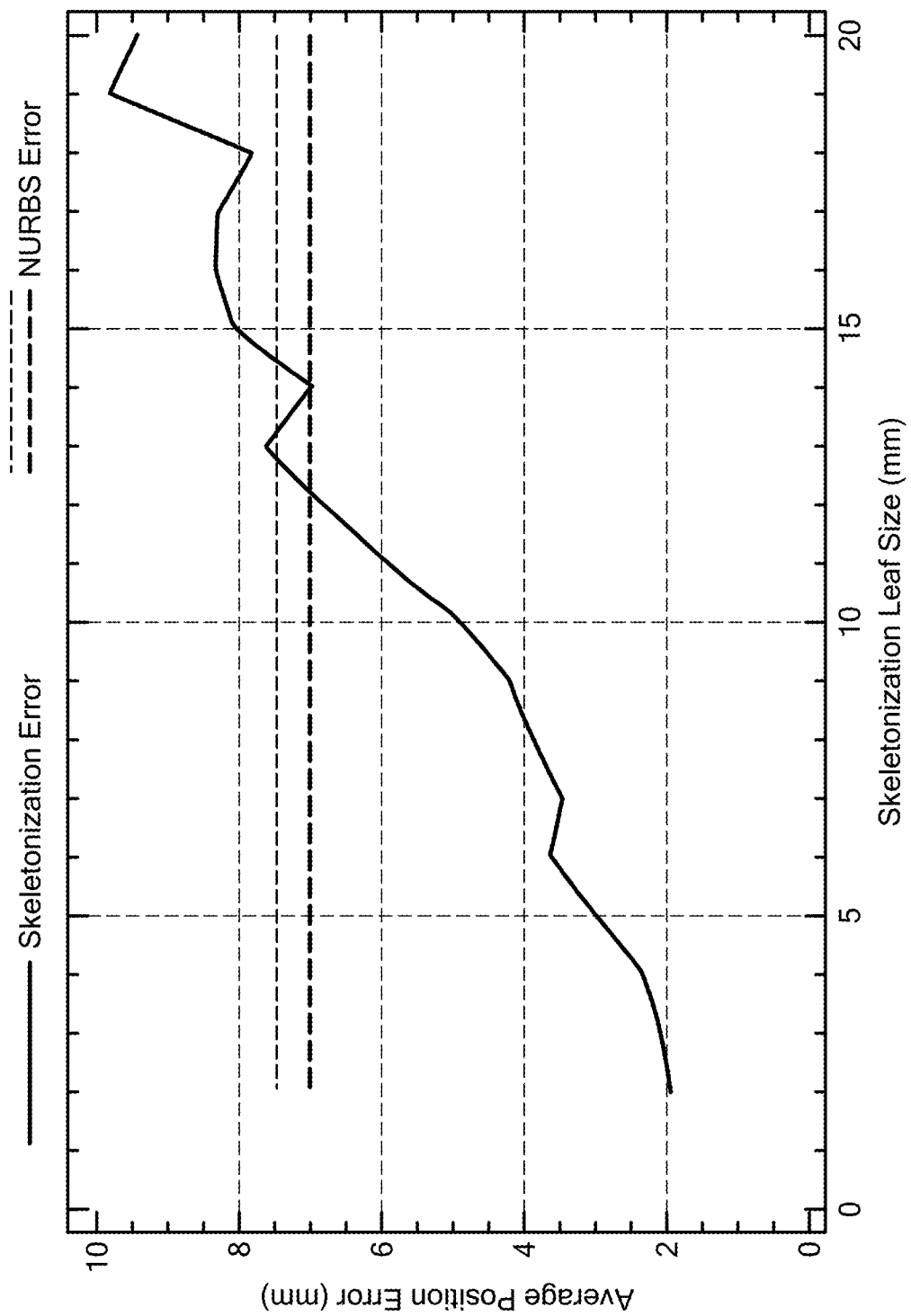
FIG. 7 shows validation of cutting deviation in a particular example of the approach of FIGS. 1-6.

The skeletonization method's primary goal is identifying the set of points equidistant to at least two boundary points, called the medial axis of a 2D image, or of a 3-D set of voxels. The skeleton obtained is a voxel-wide representation of a mesh's connectedness; useful for working with unstructured point clouds from the RGB-D camera. The skeletonization component gradually thins an image (removing boundary voxels) until it a voxel-wide line is left. One aspect of skeletonization comes from converting raw point clouds into binary voxel occupancy grids whose resolution directly correlates with the medial axis accuracy. Finer leaf size leads to better accuracy, but with a robustness tradeoff, as sparsely-sampled point clouds can lead to fragmented occupancy (falsely disconnected voxels), thus skeletonization may not be optimal. This balance is demonstrated in FIG. 7, where increase in leaf size causes a larger average error in curve fitting. FIG. 7 shows the effect of leaf size on average skeletonization error vs. average NURBS error. The fitted curve is utilized to estimate the curve direction and determine the next view for curve acquisition.

Table 1 shows a pseudocode example of exploration logic performed by the line fitting process 144. At step 612, the mobile actuator 120 determines its next end-effector position to reveal the rest of the drawn line. This includes iteratively traversing the point clouds based on successive visual frames from scanning the visual drawing 110. The next viewpoint is generated by extrapolating the fitted curve. A running list of previously visited coordinates is logged to avoid revisiting an explored direction, thus only unexplored viewpoints are sought. In addition, due to lack of a priori knowledge of the shape to be scanned and cut, there is a need for active collision avoidance techniques using feedback from the RGB-D sensor.

Exploration is done by sampling two points near the end of the line's representation. For skeletonization, those points are the last two voxels on the edge. The NURBS curve is instead extrapolated by sampling two points near the parametrized curve's edge. The mobile actuator 120 moves along the extrapolated chunk by a constrained distance close enough to the edge to avoid overshoot and missing unscanned chunks. A conservative estimate is to move towards the fitted curve's edge. Although this slows down scanning, it outputs a more robust line.

There remains three (orientation) plus one (distance-to-surface) DOFs to constrain. For robot orientation, we first constrain the end-effector's direction normally to the surface, which maximizes scan quality and motion safety. The end-effector's rotation about the normal axis is kept free to search for collision-free configurations.

The last DOF, the distance-to-surface, can be determined based on the camera noise model and required performance. To minimize noise, most cameras or optical sensors 132 should be placed as closely as allowable to the object surface 101'. An iterative solution is to start from the camera's mini-mum distance and increment until a collision-free pose is found with a viable trajectory. However, moving the robot closest to the surface forces it to move slower along the drawing, as vision is now constrained to a smaller view of the drawing, and thus more steps are required for the same distance. This tradeoff is a user-defined parameter for the pipeline regarding scanning speed and accuracy.

The exploration depicted in Table 1 expects to detect both end points of the drawing 110 to terminate properly, as shown in step 616. A single endpoint is determined by examining the amount of new information per step. The agent keeps track of the previous fully-stitched cloud's size. After frame k is processed, the agent registers the new cloud and obtains a new fully-registered cloud. The stopping criteria compares the incremented size of the fully-stitched clouds within a certain threshold:

$$\text{size}(k) - \text{size}(k-1) \leq \delta_{size} \cdot |$$

Once this condition is satisfied, the mobile actuator 120 backtracks to previously-unexplored parts of the drawing, and runs the loop again. Once the condition is satisfied a second time, the loop terminates thus the drawing is considered fully-explored, and the robot now has a fully-registered cloud of the entire filtered drawing, upon which it may perform global path generation and normal estimation. The normal estimation performed on the full cloud improves accuracy by providing more information to compute the normal planes.

TABLE I

Result: Fully-stitched point cloud of drawing
end_points_found ← 0 ;
k ← 0 ;
while end_points_found < 2 do
    |   cloud ← obtain_point_cloud( ) ;
    |   full_cloud ← concat(full_cloud, cloud) ;
    |   curve ← fit_curve(cloud) ;
    |   if size_diff(k+1, k) <= thresh
    |   then
    |     |   ++end_points_found;
    |     |   return_to_initial_point( ) ;
    |   else
    |     |   next_pos ← extrapol(curve, cloud) ;
    |   end TABLE I-continued

|   ++k ;
end

After the fully-stitched cloud is available, it becomes possible to curve-fit the filtered data using either aforementioned technique. With skeletonization, the agent uses the smallest possible leaf size when discretizing the grid, pruning smaller branches and ensuring all line points are fully-connected throughout the skeleton. Alternatively, the NURBS method generates a global fit while minimizing its error by tuning the control points, degree, or smoothness constraints.

Configurations above demonstrate a workflow for the solution of the robotic metal scrap cutting problem. This workflow leverages the human expertise and transfers the laborious aspects of the operation to the robot. The implemented pipeline for the mobile actuator acquires the cutting locations and generates a cutting path autonomously, without relying on a priori object models. The disclosed approach utilizes and compares two curve fitting approaches; others may be employed in alternate configurations.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for automated dismantling of irregularly shaped salvage components, comprising:
identifying a cutting path on a surface of a salvage article;
traversing the cutting path in a non-contacting manner with the surface based on optical recognition of the surface for generating a set of points defining the cutting path, the cutting path traversing a plurality of planes;
passing a cutting tool along a curve defined by the set of points;
determining a cutting trajectory based on the curve and on a cutting speed determined from material properties for penetration the salvage article, the cutting tool responsive to an actuator driven based on the curve;

determining a successive position of the cutting tool based on extrapolation of a subset of previous points of the set of points passed by the cutting tool;

and advancing the cutting tool within a range of the salvage article based on avoiding revisiting a previously explored direction, extrapolation based on advancing along an extrapolated chunk by a constrained distance based on a distance to an edge.

2. The method of claim 1 further comprising applying a curve fitting operation to the set of points for fitting the curve to a line defined by the set of points.

3. The method of claim 2 further comprising:
aligning the set of points in a 3 dimensional coordinate space, and disposing the actuator according to the set of points in the 3 dimensional coordinate space.

4. The method of claim 1 further comprising:
acquiring the curve by identifying curve segments based on sequences of consecutive points; and
determining a sequence of collision free points at a predetermined distance from adjacent points in the sequence.

5. The method of claim 4 further comprising:
determining a cutting trajectory based on the acquired curve and a cutting speed determined from material properties of the salvage article.

6. The method of claim 5 wherein the material properties include composition and thickness of the surface of the salvage article.

7. The method of claim 1 further comprising:
forming the cutting path from application of a pigmented substance to the salvage article based on a 3-dimensional structure exhibited by the salvage article, the pigmented substance contrasting with a coloration of the salvage article for optical recognition.

8. The method of claim 1 further comprising:
determining a successive position of the cutting tool based on extrapolation of a subset of previous points of the set of points passed by the cutting tool, and
advancing the cutting tool based on avoiding revisiting a previously explored direction.

9. The method of claim 1 wherein traversing the path traversal includes traversing a vertical plane.

10. A robotic cutting device, comprising:
a cutting tool responsive to a mobile actuator, the mobile actuator configured to apply a cutting force in a 3-dimensional space;
scanning logic configured to identify a cutting path denoted on a surface of a salvage article for cutting; and
positioning logic configured to:
determine a cutting trajectory based on the curve and on a cutting speed determined from material properties for penetration the salvage article, the mobile actuator responsive to the positioning logic for disposing the cutting tool along the cutting path in a non-contacting manner with the surface for performing the cutting on the article
determine a successive position of the cutting tool based on extrapolation of a subset of previous points of the set of points passed by the cutting tool; and
and advance the cutting tool within a range of the salvage article based on avoiding revisiting a previously explored direction, extrapolation based on advancing along an extrapolated chunk by a constrained distance based on a distance to an edge.

11. The device of claim 10 wherein the mobile actuator is responsive to an independent coordinate frame based on a position and orientation of a mobility vehicle supporting the mobile actuator, the mobility vehicle configured to be disposed adjacent to the article such that the article is within range of the actuator.

12. The device of claim 11 further comprising: an optical sensor, the scanning logic responsive to the optical sensor for tracking a deposited pigmentation on the article.

13. The device of claim 12 wherein the scanning logic is configured to detect features based on the deposited pigmentation, the features based on color filtering and a predetermined color of the pigmentation, the predetermined color in contrast from the article.

14. The device of claim 11 wherein the scanning logic is configured to:
identify a set of points defined by the deposited pigmentation;
identify a first terminus point and a second terminus point denoting ends of a curve defined by the deposited pigmentation; and
compute a continuous cutting path including the first terminus point, the second terminus point and the set of points.

15. The device of claim 14 wherein the positioning logic is configured to:
compute a 3-dimensional (3D) skeletonization based on the continuous cutting path;
align the 3D skeletonization with the independent coordinate frame; and
dispose the actuator into engagement with the article based on the continuous cutting path.

16. The device of claim 10 wherein the cutting tool is a gas driven incineration device having a fuel based on a melting temperature of the article, and the actuator is configured to engage the article in a perpendicular orientation with a surface of the article.

17. The device of claim 16 wherein the actuator is configure to be disposed at a speed based on the material of the article, the speed derived from a mapping of material types to cutting speeds.

18. A method of severing a portion of a salvage article according to a predetermined cutting path, comprising:
identifying a cutting path in the form of a visual drawing having a color known to a visually responsive cutting tool, the color distinguishable from its surroundings;
scanning the visual drawing for identifying a sequence of curve segments;
stitching the curve segments together for defining a series of points in a 3-dimensional space, further comprising:
identifying, from an initial curve segment, a set of points belonging to the visual drawing based on color filtering;
removing statistical outliers from the set of points to define a point cloud, the point cloud having a plurality of points;
iteratively traversing the point clouds based on successive visual frames from scanning the visual drawing; traversing further comprising:
traversing the cutting path in a non-contacting manner with the surface;
determining a cutting trajectory based on the curve and on a cutting speed determined from material properties for penetration the salvage article;
determining a successive position of the cutting tool based on extrapolation of a subset of previous points of the set of points passed by the cutting tool;
and advancing the cutting tool within a range of the salvage article based on avoiding revisiting a previously explored direction, extrapolation based on advancing along an extrapolated chunk by a constrained distance based on a distance to an edge; and
identifying an endpoint of the visual drawing based on a decrease in the number of the plurality of points in the point cloud falling below a threshold.

* * * * *